United States Patent Office 2,824,055
Patented Feb. 18, 1958

2,824,055

MODIFIED TERTIARY ISOOLEFIN-DIOLEFIN COPOLYMERS

Frederick W. Lampe and Henry G. Schutze, Baytown, Tex., assignors, by mesne assignments, to Esso Research and Engineering Company, Elizabeth, N. J., a corporation of Delaware No Drawing. Application August 25, 1955
Serial No. 530,639

10 Claims. (Cl. 204—163)

This invention is directed to a process for the preparation of modified tertiary isoolefin-diolefin copolymers. More particularly, this invention is directed to a process for preparing modified tertiary isoolefin-diolefin polymers which are compatible with natural and synthetic rubbers.

Conventionally prepared copolymers of about 95 to 99.5 mol percent of tertiary isoolefin with about 5 to 0.5 mol percent of diolefin have many desirable properties. However, such polymers tend to be incompatible with natural rubber and synthetic styrene-butadiene, butadiene acrylonitrile, etc. type synthetic rubbers.

An object of the present invention is the provision of modified tertiary olefin-diolefin copolymers compatible with natural and synthetic rubbers.

A further object is the provision of the process for preparing modified tertiary isoolefin-diolefin copolymers.

These and other objects are attained, in general, by dissolving a brominated interpolymer of about 95 to 99.5 mol percent of a tertiary isoolefin with about 5 to 0.5 mol percent of a diolefin in an organic solvent comprising an ethylenically unsaturated monomer susceptible to monoethylenic free-radical polymerization and exposing said solution to actinic light having a wave length within the range of about 3,000 to 4,000 A. in the presence of an amount of a chain transfer agent sufficient to substantially inhibit cross-linking, whereby a graft interpolymer of polymerized monomer and isoolefin-diolefin interpolymer is formed, and recovering said graft polymer.

The brominated polymers to be modified in accordance with the present invention are the brominated interpolymers of about 95 to 99.5 mol percent of a tertiary isoolefin with about 5 to 0.5 mol percent of diolefin. The brominated polymers should preferably contain about 0.1 to 5 weight percent of bromine. Such polymers may be prepared by the bromination of tertiary isoolefin-diolefin interpolymers. Representative of the tertiary isoolefins that may be used alone or in admixture in preparing the interpolymers are isobutylene, 2-methyl-1-butene, 2-methyl-2-butene, 2-methyl-1-pentene, 2-methyl-2-pentene, 3-methyl-2-pentene, isoheptalene, and the like. Representative conjugated diolefins which may be utilized alone or in admixture in preparing the interpolymers include diolefins such as butadiene, isoprene, 1,3-conjugated pentadienes, 1,3-conjugated hexadienes, and the like. A preferred interpolymer is the so-called "Butyl rubber" copolymer of industry which is a copolymer of about 99 mol percent of isobutylene with about 1 mol percent of isoprene. Bromination of the tertiary isoolefin-diolefin interpolymers may be accomplished by known techniques. In addition, it has been discovered in accordance with the present invention that bromination may be accomplished in the presence of actinic light without interpolymer decomposition by exposing an organic solvent solution of a tertiary isoolefin-diolefin interpolymer to actinic light having a wave length within the range of about 3,000 to 4,000 A. in the presence of a brominating agent. It is preferable to use the so-called "black light" which has an intensity peak at a wave length of 3,650. Representative organic solvents that may be used for this purpose include aromatic hydrocarbons such as benzene, naphthalene, etc., halogenated hydrocarbons such as carbon tetrachloride, etc. carbon disulfide, etc. Illustrative of the brominating agents are carbon tetrabromide, bromine, bromine succinimide, etc. The amount of brominating agent employed and the duration of exposure to the actinic light should be regulated in order to provide a brominated interpolymer containing about 0.1 to 5 weight percent of bromine. It is preferable that the brominated polymer contain about 1 to 3 weight percent of bromine. As a general rule, it is preferable to use about 1 to 20 parts by weight of polymer per part of brominating agent and to employ an exposure time of about 1.0 to 24 hours. It will be understood that for a given concentration of brominating agent the duration of actinic light exposure will be dependent on the intensity of radiation.

The graft polymers of the present invention are prepared by dissolving a brominated tertiary isoolefin-diolefin interpolymer in an organic solvent comprising an ethylenically unsaturated monomer susceptible to monoethylenic free radical polymerization and exposing the resultant solution to actinic light having a wave length within the range of about 3,000 to 4,000 A. in the presence of an amount of a chain transfer agent sufficient to substantially inhibit cross-linking.

The solvent to be used may consist essentially of the graft monomer to be polymerized on the isoolefin-diolefin polymer chain or may comprise a mixture of such monomer and a non-reactive organic solvent. Brominated tertiary isoolefin-diolefin interpolymers have improved solubility characteristics as compared with un-brominated interpolymers and, as a result, a wide variety of monomers and non-reactive organic solvents may be employed. It will be understood that when a non-reactive organic solvent is to be used, it should be a solvent in which both the brominated interpolymer and the graft monomer are soluble. Representative non-reactive organic solvents include hydrocarbons such as benzene, the ortho-, meta- and paraxylenes and mixtures thereof, toluene, n-hexane, n-heptane, n-octane, cyclohexane, carbon disulfide, etc.

Among the monoethylenically unsaturated monomers that may be used are aromatic hydrocarbons having monoethylenic side chain unsaturation such as styrene, alpha methyl styrene, vinyl naphthalene, vinyl toluene, etc., monoethylenically polymerizable conjugated dienes such as butadiene, isoprene, 1,3-conjugated pentadienes, 1,3-conjugated hexadienes, etc., acrylonitrile, acrylates and methacrylates such as methyl acrylate, methyl methacrylate, etc. and the like. Mixtures of two or more mutually soluble monomers may also be used if desired.

The solvent comprising the ethylenically unsaturated monomer susceptible to monoethylenic free radical polymerization should be used in an amount sufficient to provide a ratio of about 100 to 10,000 mols of graft monomer per mol of combined bromine in the brominated interpolymer.

As indicated, the solution of brominated interpolymer should also contain an amount of a chain transfer agent such as carbon tetrachloride, carbon tetrabromide, pentaphenyl ethane, etc. to substantially inhibit cross-linking. This is generally accomplished by the use of about 0.01 to 0.1 parts of chain transfer agent per part of solution.

The ethylenically unsaturated monomer is polymerized to form graft chains on a tertiary isoolefin-diolefin interpolymer in accordance with the present invention by exposing the solution of brominated interpolymer in the monomer-comprising solvent to actinic light having a wave length within the range of about 3,000 to 4,000 A. A preferred source of actinic radiation is the so-called "black light" which has its intensity peak at a wave length of about 3,650 and which covers a spectrum of about 3,000 to 4,000 A. The time of exposure will be largely dependent on the intensity of radiation. As a general rule, an exposure time of about 1 to 24 hours is sufficient to substantially complete the graft polymerization reaction. The graft polymerization reaction is preferably conducted at a temperature of about 25° to about 40° C. The reaction is preferably conducted at room temperature. The polymerization reaction may be conducted at atmospheric pressure although in some situations it may be preferable to use somewhat higher or lower pressures.

The graft polymers of the present invention may be recovered by any suitable means such as, for example, by fractional precipitation from an organic solvent solution of the polymerization reaction products.

The following examples are given by way of illustration and are not intended as limitations on the scope of this invention. Where parts are mentioned they are parts by weight.

Example I

Dissolve about 100 parts of a copolymer of about 99 mol percent of isobutylene and about 1 mol percent of isoprene and 20 parts of carbon tetrabromide in about 2500 parts of benzene. Irradiate the thus prepared solution with "black light" for about 12 hours to form a brominated isobutylene-isoprene copolymer containing about 3 weight percent of bromine and at the end of this time terminate irradiation in order to terminate the reaction. Precipitate the brominated polymer by adding about 1,000 parts of methanol and recover, wash and dry the precipitated polymer.

Example II

Dissolve about 100 parts of the brominated polymer of Example I and about 0.1 part of carbon tetrabromide in about 2,000 parts of monomeric styrene. Irradiate the solution with "black light" for about 12 hours to polymerize the styrene. After the polymerization reaction has gone to substantial completion terminate irradiation in order to terminate the reaction. Dissolve the resultant reaction mixture in benzene and then add methanol thereto in order to precipitate a polymer which is a graft polymer of styrene and the isobutylene-isoprene copolymer containing polystyrene chains of about 100 styrene units grafted on the isobutylene-isoprene copolymer chain.

The thus prepared graft polymer is compatible with natural rubber and synthetic rubbers such as butadiene-styrene copolymer rubbers and may be homogeneously incorporated therein by any suitable means such as milling, extruding, etc.

Equally satisfactory results are obtained when acrylonitrile is substituted for the styrene and Example II is otherwise repeated. In this instance a polymer comprising graft chains of polyacrylonitrile on the isobutylenes-isoprene copolymer is formed.

Example III

Dissolve about 100 parts of the brominated copolymer of Example I and about 0.1 part of carbon tetrabromide in about 3,000 parts of liquefied isoprene. Expose the resultant solution to "black light" for about 12 hours and then terminate the irradiation.

Recover from the resultant reaction mixture by fractional precipitation with methane a polymer comprising polyisoprene chains containing an average of about 100 isoprene units grafted onto the original isobutylene-isoprene copolymer. The thus obtained graft polymer is likewise compatible with natural and synthetic rubbers.

Example IV

In order to obtain the graft polymers of the present invention it is necessary to react the tertiary isoolefin-diolefin polymer with a brominating agent in the presence of actinic light having a wave length within the range of about 3,000 to 4,000 A. in order to obtain a brominated polymer upon which a monoethylenically unsaturated hydrocarbon may be grafted. This is shown by the following example.

Dissolve about 100 parts of a copolymer of 99 mol percent of isobutylene and 1 mol percent of isoprene and about 20 parts of carbon tetrachloride in about 2,000 parts of benzene and expose the resultant solution to "black light" for about 12 hours and then terminate the irradiation. The isobutylene - isoprene copolymer is not modified by this treatment.

Next employ actinic light having a wave length of about 2,500 to about 2,600 A. As a result, there is formed a chlorinated product. However, the isobutylene-isoprene copolymer is degraded as is shown by the fact that the benzene solution of the copolymer as initially prepared has a viscosity of about 61 centistokes whereas the solution after exposure to actinic light having a wave length of about 2,500 to 2,600 A. has a viscosity of only about 1 centistoke.

Having thus described our invention, what is claimed is:

1. A process which comprises dissolving a copolymer of about 95 to 99.5 mol percent of a tertiary olefin with about 5 to 0.5 mol percent of a diolefin and carbon tetrabromide in an organic solvent and exposing the resultant solution to actinic light having a wave length within the range of about 3,000 to 4,000 A. whereby a brominated tertiary isoolefin-diolefin is formed.

2. A process as in claim 1 wherein the copolymer is a copolymer of isobutylene with isoprene.

3. A process which comprises the steps of dissolving a copolymer of about 95 to 99.5 mol percent of a tertiary olefin with about 5 to 0.5 mol percent of a diolefin and carbon tetrabromide in an organic solvent and exposing the resultant solution to actinic light having a wave length within the range of about 3,000 to 4,000 A. whereby a brominated tertiary isoolefin-diolefin is formed, recovering the thus prepared brominated polymer, dissolving said recovered polymer in a solvent comprising an ethylenically unsaturated vinyl monomer susceptible to monoethylenic free radical polymerization together with an amount of a chain transfer agent sufficient to inhibit cross-linking and polymerizing said unsaturated monomer whereby branch chains comprising polymers of said unsaturated monomer compound are grafted onto said brominated polymer.

4. A process as in claim 3 wherein the tertiary isoolefin-diolefin copolymer is an isobutylene-isoprene copolymer.

5. A process as in claim 4 wherein the ethylenically unsaturated monomer is styrene.

6. A process which comprises the steps of dissolving a copolymer of about 95 to 99.5 mol percent of a tertiary isoolefin with about 5 to 0.5 mol percent of a diolefin and carbon tetrabromide in an aromatic hydrocarbon solvent, exposing the resultant solution to actinic light having a wave length within the range of about 3,000 to 4,000 A. to prepare a brominated tertiary isoolefin-diolefin polymer, and reacting said thus prepared brominated polymer in solution with monomeric styrene in the presence of a cross linking inhibiting amount of a chain transfer agent to prepare a graft polymer comprising polystyrene chains grafted on the isobutylene-isoprene copolymer.

7. A process which comprises the steps of exposing a solution of a brominated polymer of about 95 to 99.5 mol percent of a tertiary isoolefin and 5 to 0.5 mol percent of a diolefin in a solvent comprising an ethylenically unsaturated vinyl monomer susceptible to monoethylenic free radical polymerization containing an amount of a chain transfer agent sufficient to prevent cross-linking of said unsaturated monomer with actinic light having a wave length within the range of about 3,000 to 4,000 A. whereby there is formed a graft polymer comprising chains of polymerized monomer grafted onto said tertiary isoolefin-diolefin polymer.

8. A process as in claim 7 wherein the tertiary isoolefin-diolefin polymer is a copolymer of isobutylene with isoprene and wherein the unsaturated monomer is styrene.

9. A graft polymer prepared by the process of claim 7.
10. A graft polymer prepared by the process of claim 8.

References Cited in the file of this patent
UNITED STATES PATENTS

| | | |
|---|---|---|
| 2,575,125 | Prober | Nov. 13, 1951 |
| 2,631,984 | Crawford et al. | Mar. 17, 1953 |
| 2,698,041 | Morrissey et al. | Dec. 28, 1954 |